(12) United States Patent
Ersahin et al.

(10) Patent No.: US 9,476,490 B2
(45) Date of Patent: Oct. 25, 2016

(54) EXTENDED TURBINE BLADE

(71) Applicant: Schaeffler Technologies AG & Co. KG, Herzogenaurach (DE)

(72) Inventors: Cem Ersahin, Copley, OH (US); Todd J. Sturgin, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 569 days.

(21) Appl. No.: 13/715,049

(22) Filed: Dec. 14, 2012

(65) Prior Publication Data

US 2013/0160438 A1 Jun. 27, 2013

Related U.S. Application Data

(60) Provisional application No. 61/579,879, filed on Dec. 23, 2011.

(51) Int. Cl.
*F16H 41/26* (2006.01)
*F16D 33/20* (2006.01)

(52) U.S. Cl.
CPC .............. *F16H 41/26* (2013.01); *F16D 33/20* (2013.01)

(58) Field of Classification Search
CPC .................................. F16D 33/20; F16H 41/26
USPC ...... 60/361, 362, 364, 365, 366; 416/1, 180, 416/197 C
See application file for complete search history.

(56) References Cited

U.S. PATENT DOCUMENTS

| | | | |
|---|---|---|---|
| 2,140,106 A * | 12/1938 | Cox et al. ........................ | 60/367 |
| 2,263,996 A * | 11/1941 | Kimberly, Jr. .................. | 60/365 |
| 2,428,134 A * | 9/1947 | Zeidler ......................... | 415/141 |
| 3,023,582 A * | 3/1962 | Ryan ............................. | 60/338 |
| 3,891,350 A * | 6/1975 | Adachi et al. ................ | 416/180 |
| 6,334,307 B1 * | 1/2002 | Iwao et al. ...................... | 60/367 |
| 6,360,533 B1 | 3/2002 | Turner et al. | |
| 6,886,330 B1 | 5/2005 | Turner | |
| 2008/0247878 A1* | 10/2008 | Saitou ........................... | 416/180 |
| 2009/0282821 A1* | 11/2009 | Kombowski .................. | 60/330 |

FOREIGN PATENT DOCUMENTS

| | | | | |
|---|---|---|---|---|
| JP | 07-004496 | * | 1/1995 | ............. F16H 41/28 |
| JP | 09-042413 | * | 7/1995 | ............. F16H 41/28 |

* cited by examiner

*Primary Examiner* — Michael Leslie
*Assistant Examiner* — Matthew Wiblin
(74) *Attorney, Agent, or Firm* — Simpson & Simpson, PLLC

(57) ABSTRACT

A torque converter, including: an impeller and a turbine with: a shell; and at least one blade including: a blade body with a first edge connected to the shell; and a portion extending from the blade body. The torque converter includes a stator including: a stator body, and at least one stator blade axially disposed between the impeller and the turbine and connected to the stator body. A circumferential space is formed between the turbine shell and the stator body. At least a portion of the circumferential space is radially aligned with the portion of the at least one blade.

10 Claims, 7 Drawing Sheets

EXTENDED TURBINE BLADE

CROSS-REFERENCE TO RELATED APPLICATIONS

This application claims the benefit of U.S. Provisional Patent Application No. 61/579,879, filed Dec. 23, 2011.

TECHNICAL FIELD

The present disclosure relates to a blade for a turbine in a torque converter, in particular, an extended blade arranged to direct flow from the turbine to a stator.

BACKGROUND

FIG. 7 is a partial cross-section of prior art torque converter 200. In torque converter 200, the flow paths F of fluid from turbine 202 to stator 204 are influenced by the configuration of blades 206, in particular portion 208 of the blades. Fluid flows along surface 210 of blade 206, or follows a path paralleling the surface. When the fluid reaches portion 208 and edge 212, the fluid continues in substantially the same direction, since portion 208 and edge 212 do not alter the curvature of blade 206 along which the fluid is flowing. Thus, flow paths F continue past edge 212 as shown in FIG. 1.

Torque converter 200 includes circumferential gap 214 between shell 216 of the turbine and the stator. Due to the angle of the flow paths upon leaving the turbine blade, fluid is directed radially inward, causing some of the fluid to enter gap 214, and resulting in leakage of the fluid flow from the turbine to the stator and impeller 218. That is, rather than flowing to the impeller, this fluid is lost in gap 214, reducing torque and efficiency for the torque converter.

The amount of torque produced by fluid flowing from the turbine through the stator to the impeller is a function of where the fluid contacts blades 220 of the stator. Specifically, the further the fluid contacts the stator blades in a radially outward direction, the more torque is produced. Since flow lines F are directed generally radially inward, the fluid tends to contact the radially inner portions of blades 220, reducing the torque possible with the fluid flow.

SUMMARY

According to aspects illustrated herein, there is provided a torque converter, including: an impeller and a turbine with: a shell; and at least one blade including: a blade body with a first edge connected to the shell; and a portion extending from the blade body. The torque converter includes a stator including: a stator body, and at least one stator blade axially disposed between the impeller and the turbine and connected to the stator body. A circumferential space is formed between the turbine shell and the stator body. At least a portion of the circumferential space is radially aligned with the portion of the at least one blade.

According to aspects illustrated herein, there is provided a turbine for a torque converter, including: a shell; and a blade including: a blade body with an edge connected to the shell; a first segment extending from the blade body and including a first surface in contact with a second surface of the shell; and a second segment extending from the first segment, at least partially separated from the blade body by the first segment, and forming a distal end of the at least one blade free of contact with the turbine shell.

According to aspects illustrated herein, there is provided a turbine for a torque converter, including: a shell; and a blade including: a blade body with an edge connected to the shell; a first segment continuous with the blade body and with a first surface facing the first section of the shell or in contact with the first section of the shell; and a second segment extending from the first segment, at least partially separated from the blade body by the first segment, and forming a distal end of the at least one blade free of contact with the shell. An axial plane passing through the blade body and the first and second segments the second segment forms: a straight line; a smooth curve; or a U shape.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
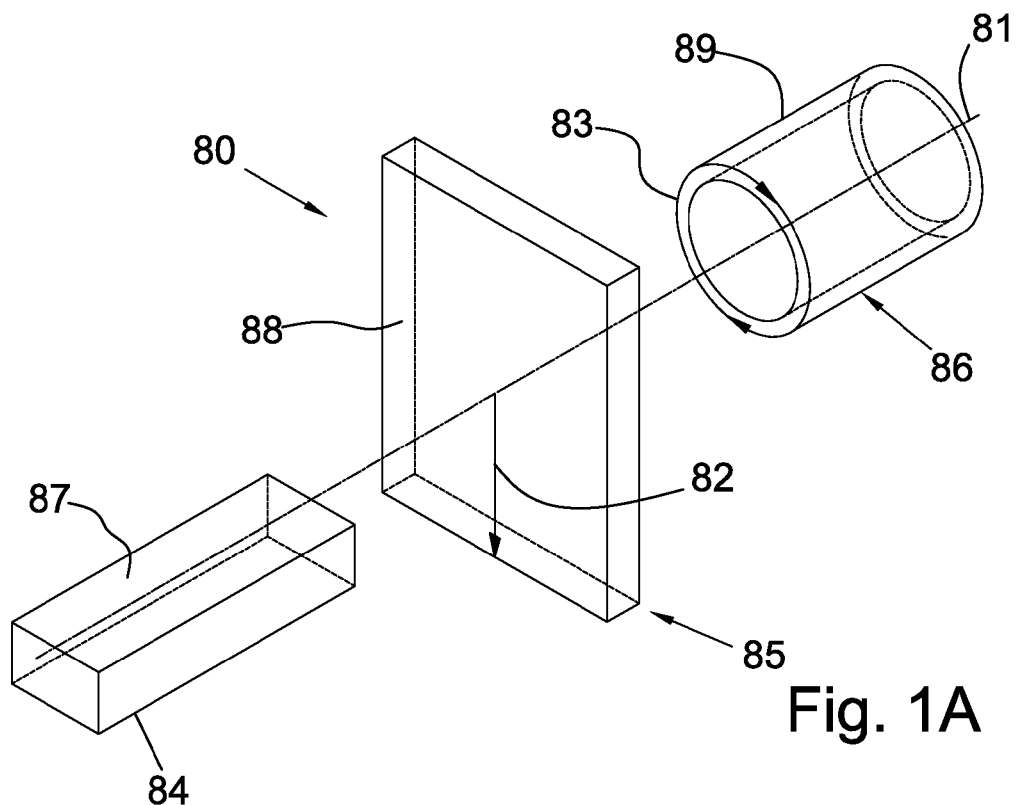
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
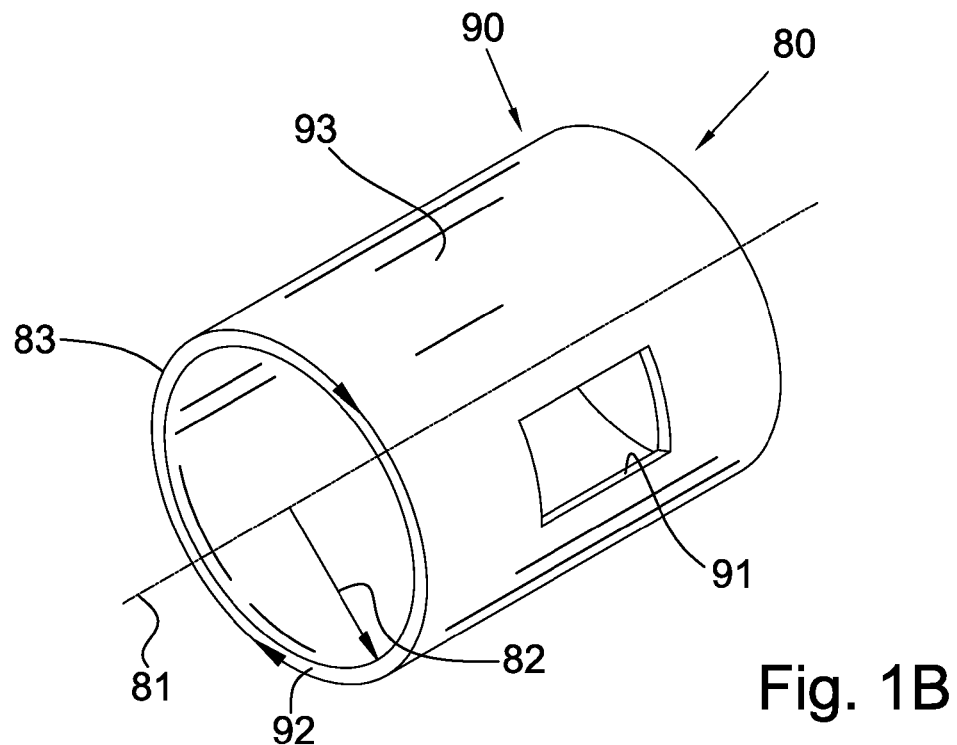
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
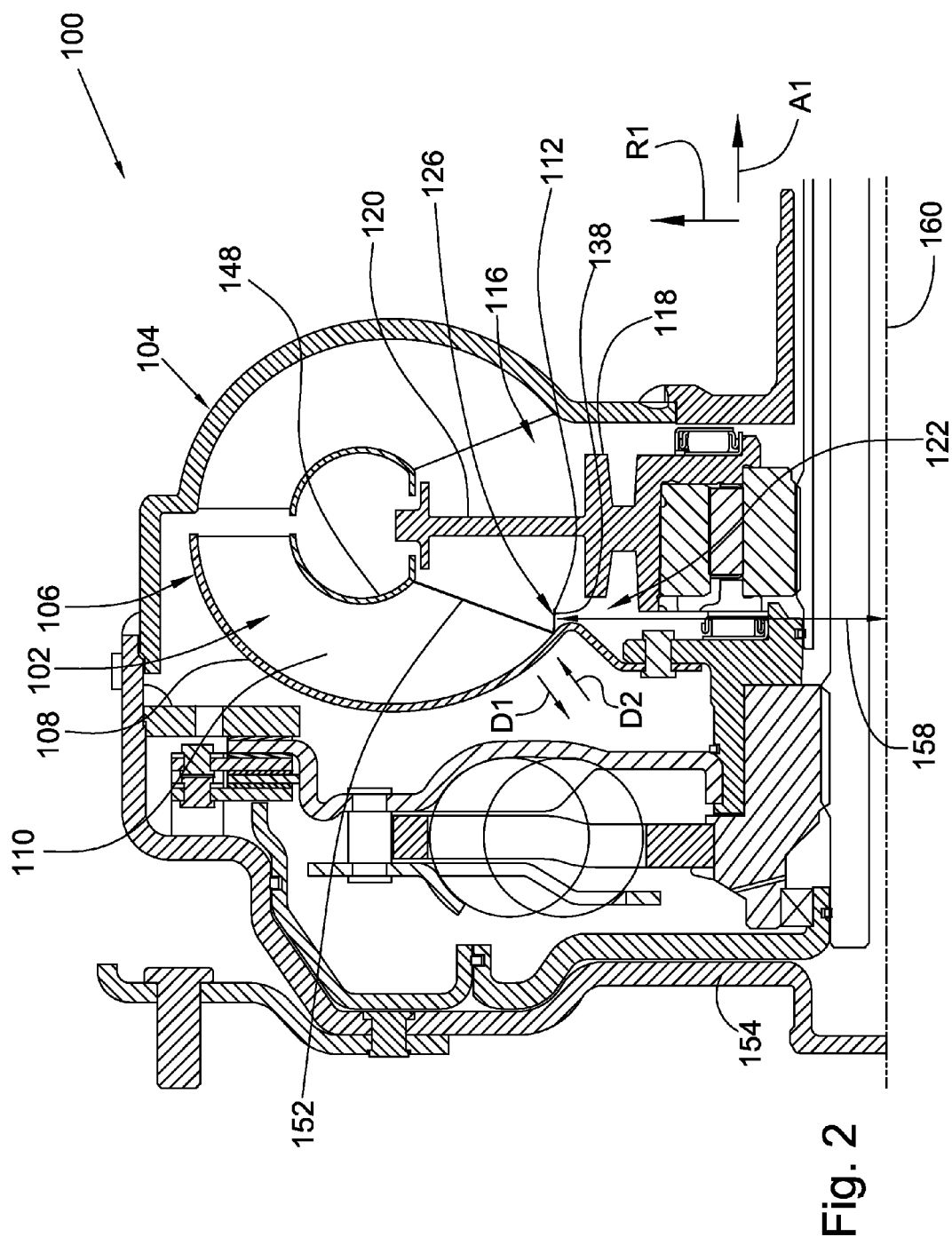
FIG. 2 is a partial cross-sectional view of a torque converter with extended turbine blades.

FIG. 2 is a partial cross-sectional view of torque converter 100 with extended turbine blades 102.

Figure 3:
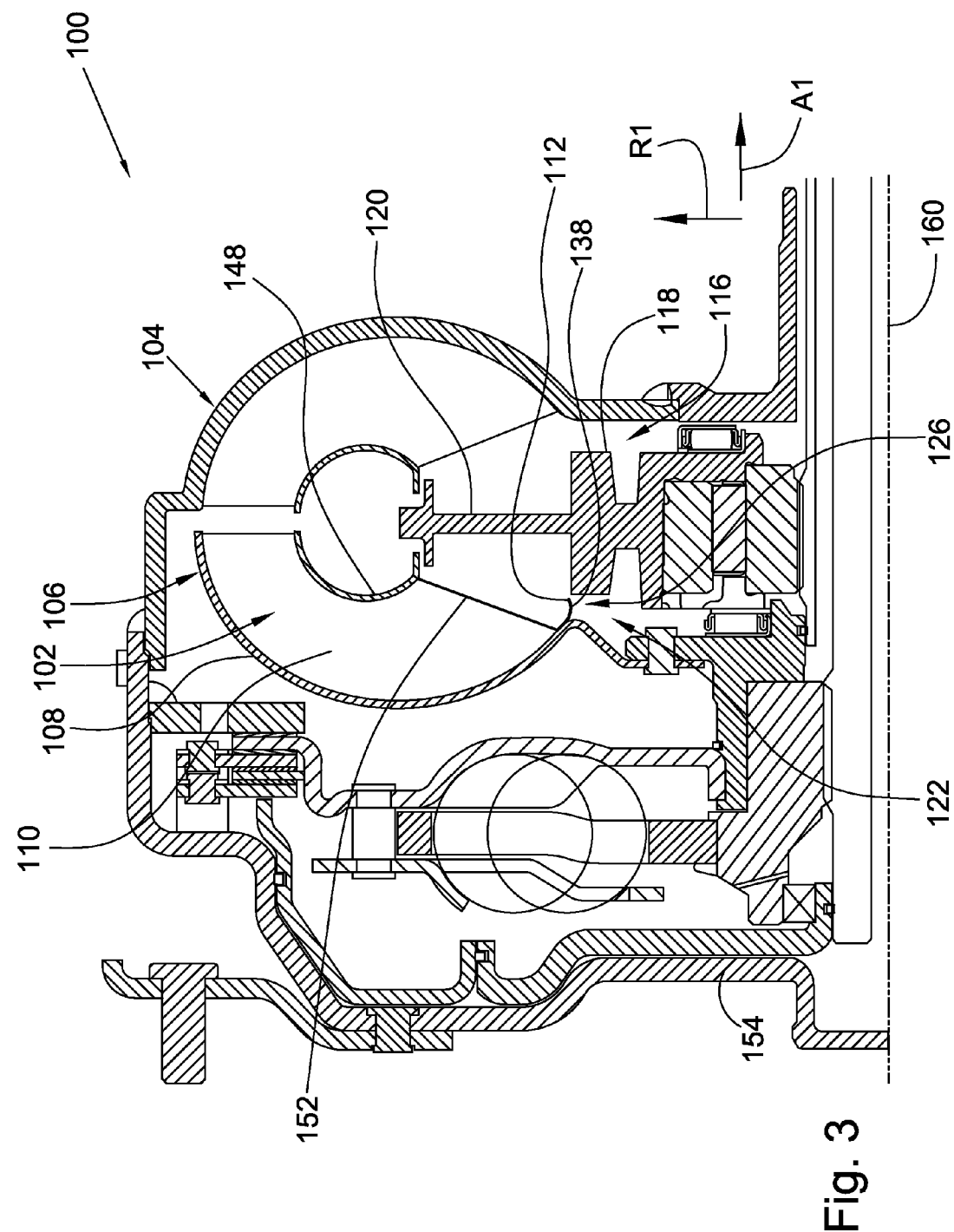
FIG. 3 is a partial cross-sectional view of a torque converter with extended turbine blades having a U-shape.

FIG. 3 is a partial cross-sectional view of torque converter 100 with extended turbine blades 102 having a U-shape.

Figure 4:
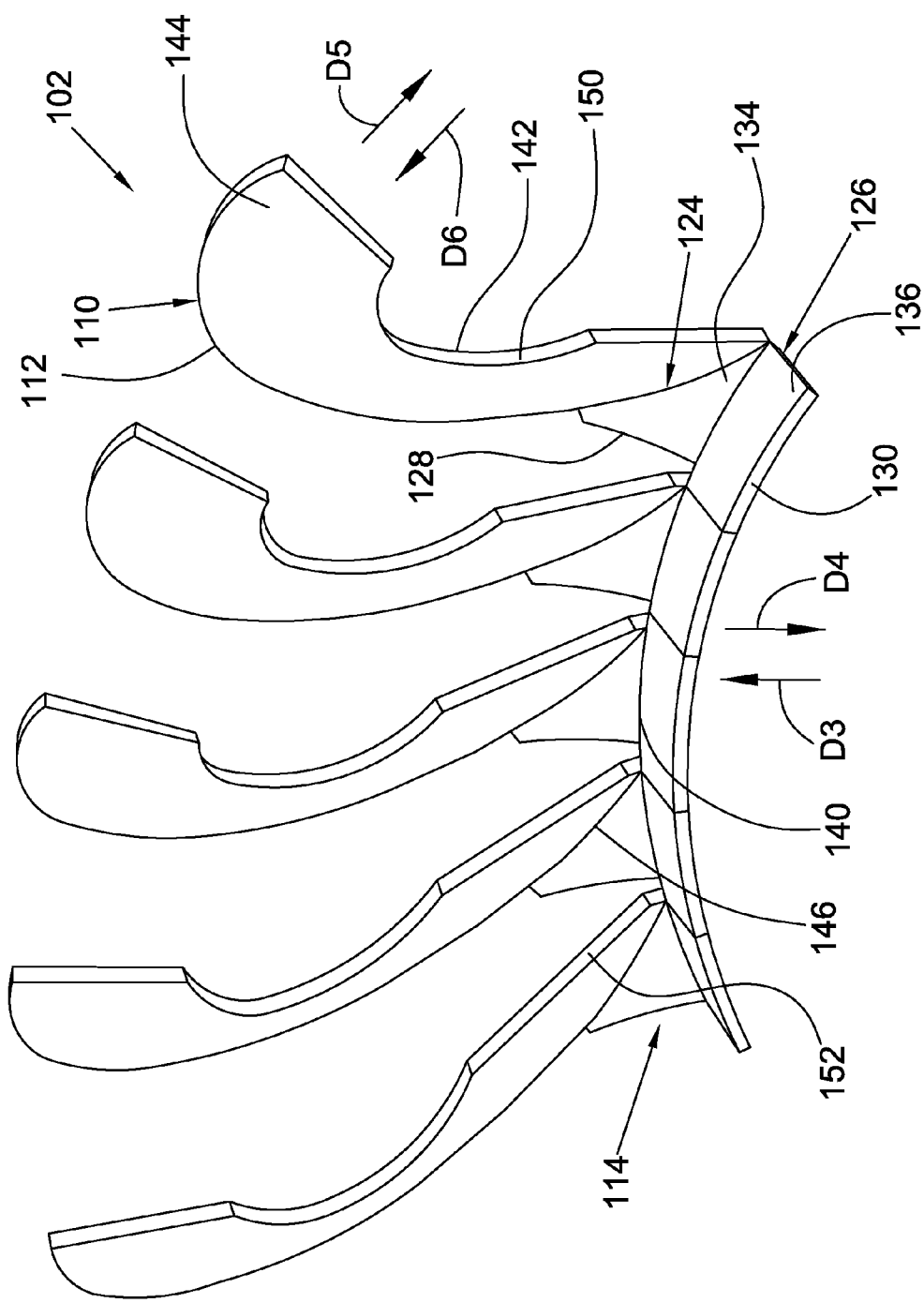
FIG. 4 is a perspective view of a plurality of extended turbine blades.

FIG. 4 is a perspective view of a plurality of extended turbine blades 102.

Figure 5:
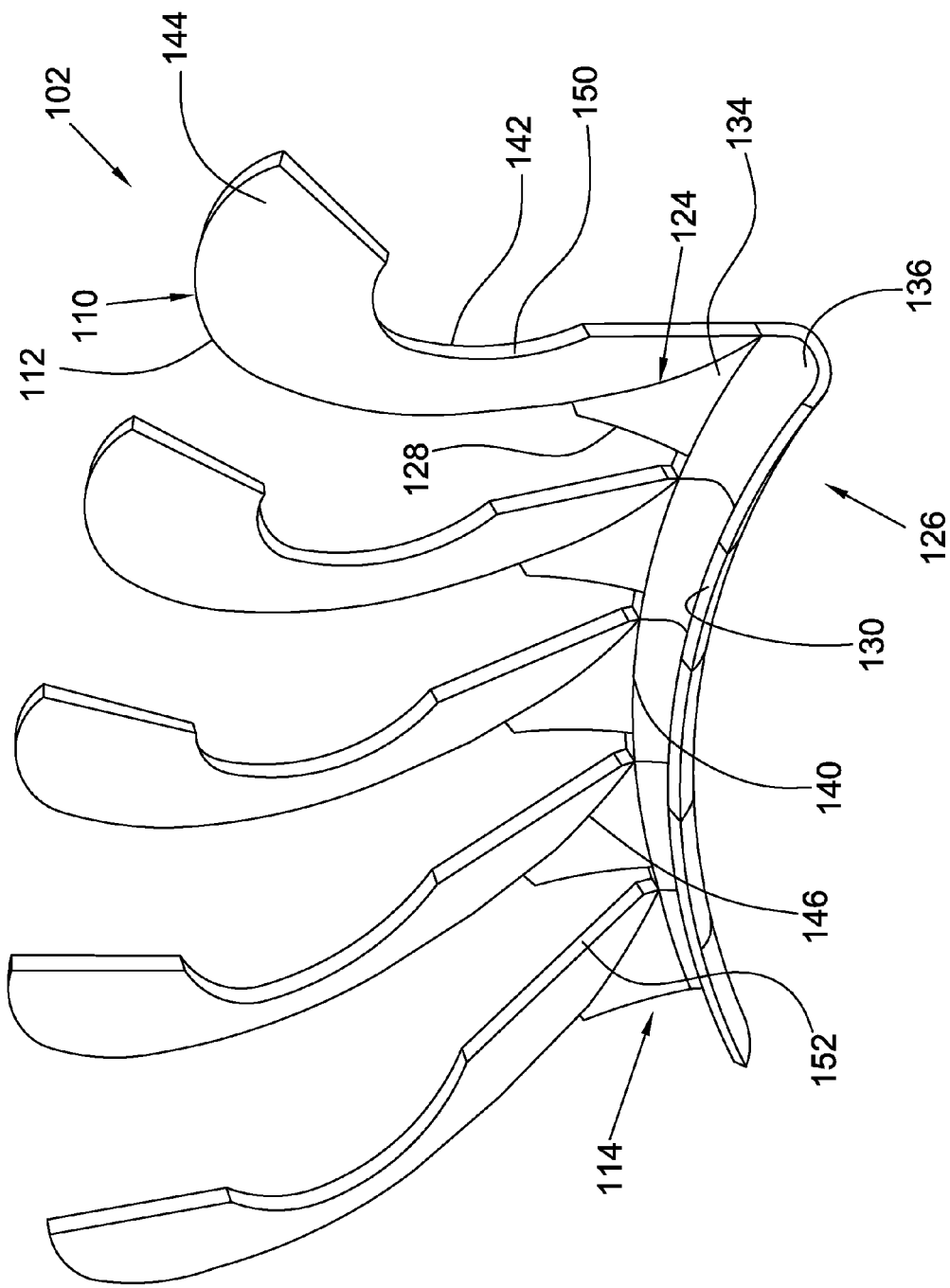
FIG. 5 is a perspective view of a plurality of extended turbine blades with a U-shape.

FIG. 5 is a perspective view of a plurality of extended turbine blades 102 with a U-shape. The following should be viewed in light of FIGS. 2 through 5. Torque converter 100 includes impeller 104 and turbine 106. The turbine includes shell 108 and at least one blade 102. Blade 102 includes blade body 110 with edge 112 connected to the shell, and portion 114 extending from the blade body. The torque converter includes stator 116 with stator body 118 and at least one stator blade 120. Blade 120 is axially disposed between the impeller and the turbine and connected to the stator body. Circumferential space 122 is formed between the turbine shell and the stator body, and at least a portion of the circumferential space is radially aligned with portion 114 of blade 102. In an example embodiment, for example, as shown in FIGS. 2 and 3, the circumferential space is wholly aligned with portion 114 in radial direction R1.

Portion 114 of blade 102 extends from the blade body at least partially in axial direction A1 toward the stator blade. In an example embodiment, portion 114 includes segments 124 and 126. Segment 124 is continuous with the blade body and includes surface 128 in contact with the shell. Segment 126 extends from segment 124, is at least partially separated from the blade body by segment 124, and forms distal edge 130 of portion 114. In an example embodiment, at least a portion of circumferential space 122 is radially aligned with segment 126. In an example embodiment, all of space 122 is radially aligned with segment 126.

In an example embodiment, segment 126 forms a straight line or a smooth curve in an axial plane passing through the blade body and segments 124 and 126, for example, as shown in FIGS. 2 and 4. In an example embodiment, segment 126 forms a U shape that opens in a radially outward direction in an axial plane passing through the blade body and segments 124 and 126, for example, as shown in FIGS. 3 and 5. In an example embodiment, segment 126 includes circumferential surface 136.

In an example embodiment, blade 102 is formed of a single piece of folded metal, that is, body 110 and segments 124 and 126 are formed of a single piece of folded metal. Surface 128 of segment 124 faces in direction D1, toward the shell. Segment 124 also includes surface 134 facing in direction D2, opposite direction D1. Segment 126 includes surfaces 136 and 138 joined at distal edge 130 and facing opposite directions D3 and D4, respectively. Surfaces 128 and 134 are continuous with surfaces 138 and 136, respectively, and are disjoint with surfaces 138 and 136, respectively, for example, at seam 140. The blade body includes surfaces 142 and 144 surfaces facing opposite directions D5 and D6 and connected at edge 112. Surfaces 136, 134, and 144 form a continuous disjoint surface, for example, disjoint at seams 140 and 146.

In an example embodiment, the torque converter includes core ring 148. Blade 102 includes edge 150 connected to the core ring and edge 152 connecting edges 112 and 150 and axially aligned with the stator. Edge 130 is free of contact with the blade body and segment 124 and at least a portion of edge 112 extends beyond edge 152 in an axial direction. For example, all of edge 112 extends beyond edge 152 in direction A1 in FIGS. 2 and 3. Edge 112 also can be described by the axial and radial positioning of the edge. As shown in FIG. 2, edge 112 is in a fixed axial position, for example, using cover 154 as a fixed axial point of reference. This distance will not vary unless the turbine shell axially displaces. Edge 112 also is at fixed radial distance 158 from axis of rotation 160 for the torque converter.

Figure 6C:
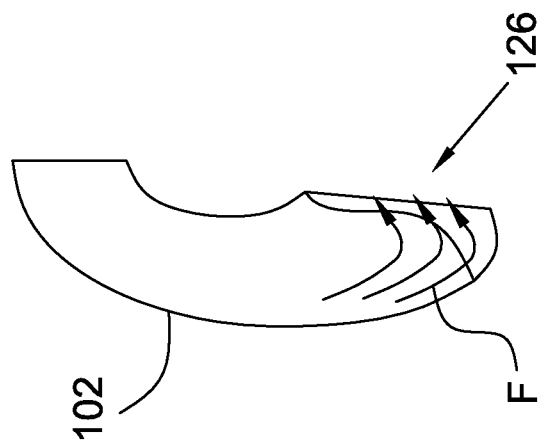
FIGS. 6A through 6C shown flow paths for a prior art turbine blade and two extended turbine blades; and, FIG. 7 is a partial cross-section of a prior art torque converter.
Figure 6B:
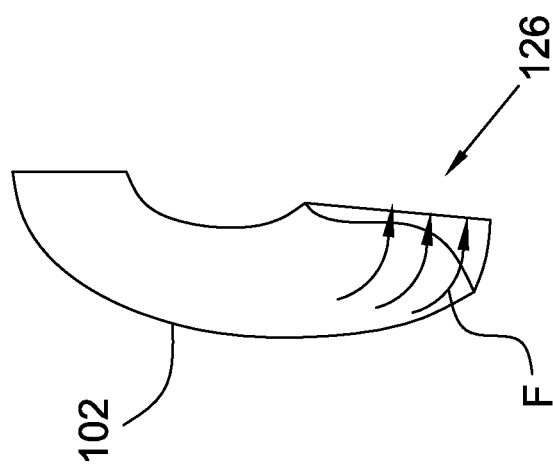
Figure 6A:
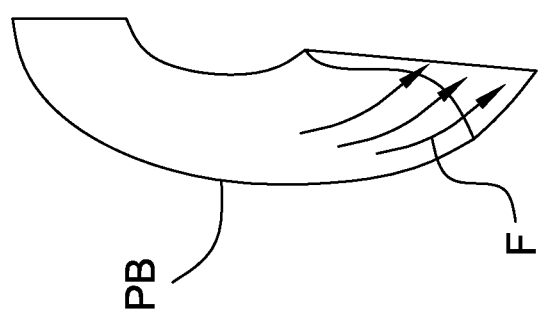

FIGS. 6A through 6C shown flow paths for a prior art turbine blade and two extended turbine blades. The following should be viewed in light of FIGS. 2 through 6C. The following provides further detail regarding torque converter 100, turbine 106, and blade 102. As noted above, two problems with prior art torque converts are leakage to the gap between the turbine and the stator, and loss of torque due to fluid mostly contacting radially inward portions of the stator blades. As shown in FIG. 6A, the radially inward flow lines resulting from the configuration of prior art blade PB cause this radially inward flow.

Figure 7:
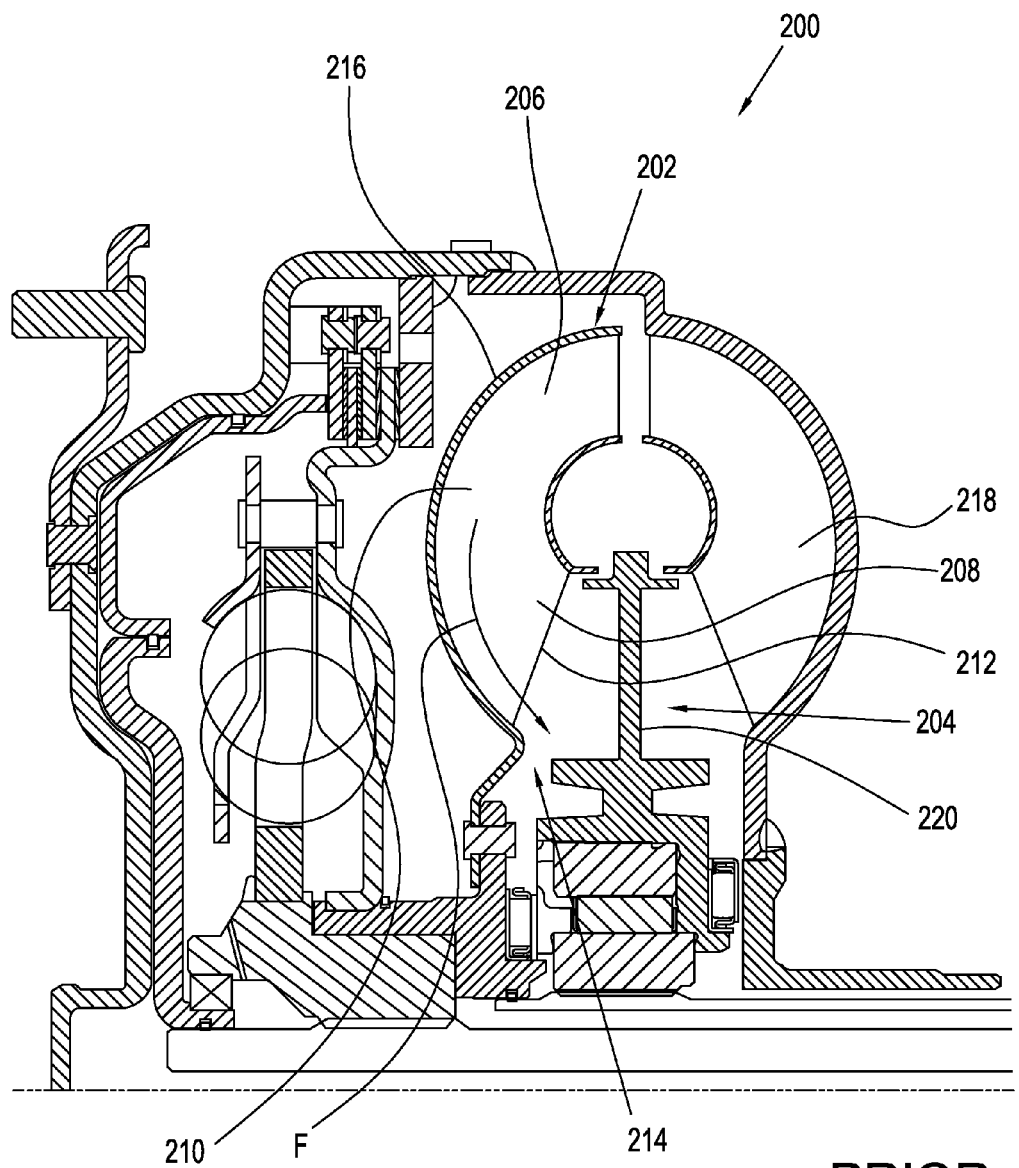

Advantageously, blade 102 provides solutions for both these problems. For example, as shown in FIG. 6B, the configuration of blade 102 in FIGS. 2 and 4 results in segment 126 blocking flow to gap 122 shown in FIGS. 2 and 3. For example, as the fluid flows along surfaces 144 and 134 in FIG. 4, the fluid encounters surface 136, which is essentially parallel to axis R for torque converter 100. Since segment 126 is radially aligned with gap 122, segment 126 prevents fluid from flowing radially inward toward the gap. Further, as a result of the axial alignment of segment 126, the fluid is following in an axial direction toward the stator, rather than in a radially downward direction, further reducing the possibility of leakage flow. In addition, flow path F in FIG. 6B contacts the stator blades radially more outwardly than in FIG. 7, increasing the torque output of torque converter 100.

The configuration of segment 126 in FIGS. 3 and 5 provides the same diversion of the fluid away from gap 122, and as shown in FIG. 6C causes the fluid to flow radially outward toward the stator. Thus, flow path F in FIG. 6C contacts the stator blades radially more outwardly than in FIG. 6B, even further increasing the torque output of torque converter 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A torque converter, comprising:
a core ring;
an axis of rotation;
an impeller; and,
a turbine with:
a shell; and,
at least one blade including:
a blade body with a first edge connected to the shell;
a second edge connected to the shell and to the core ring, the second edge extending from the shell to the core ring; and,
a portion extending from the blade body at least partially in a direction parallel to the axis of rotation, wherein in an plane, defined as common to the axis of rotation, passing through the blade body and the portion, the portion forms a straight line, a smooth curve, or a U shape.

2. The torque converter of claim 1, wherein the portion of the at least one blade includes a circumferential surface.

3. The torque converter of claim 1, wherein the U shape opens in a radially outward direction.

4. The torque converter of claim 1, wherein:
the blade body and the portion are formed of a single piece of folded metal.

5. A turbine for a torque converter, comprising:
a core ring;
a shell; and,
a blade including:
a blade body with an edge connected to the shell and to the core ring, the edge extending from the shell to the core ring;
a first segment extending from the blade body and including a first surface in contact with a second surface of the shell; and,
a second segment:
extending from the first segment at least partially in a direction parallel to the axis of rotation;
forming a straight line in a plane, defined as common to the axis of rotation, passing through the blade body and the first and second segments; and,
at least partially separated from the blade body by the first segment, and forming a distal end of the at least one blade free of contact with the turbine shell.

6. The torque converter of claim 5, wherein:
the second segment includes a first section in contact with the first segment and a second section forming the distal end; and,
the first and second sections of the second segment form a U shape opening in a radially outward direction.

7. The torque converter of claim 5, wherein:
the first surface faces in a first direction;
the first segment includes a second surface facing in a second direction, opposite the first direction;
the second segment includes third and fourth surfaces joined at the distal end and facing in third and fourth opposite directions, respectively, and continuous with the first and second surfaces;
the blade body includes fifth and sixth surfaces facing in fifth and sixth opposite directions and connected at the edge;
the second and fourth surfaces are joined by a first seam; and,
the fourth and sixth surfaces are joined by a second seam.

8. A turbine for a torque converter, comprising:
a core ring;
a shell; and,
a blade including:
a blade body with an edge connected to the shell and to the core ring, the edge extending from the shell to the core ring;
a first segment continuous with the blade body and with a first surface facing the first section of the shell or in contact with the first section of the shell; and,
a second segment:
extending from the first segment;
at least partially separated from the blade body by the first segment;
connected to the first segment by a first seam; and,
forming a distal end of the at least one blade free of contact with the shell, wherein in an axial plane, defined as common to an axis of rotation, passing through the blade body and the first and second segments the second segment forms: a straight line; a smooth curve; or a U shape.

9. The torque converter of claim 8, wherein:
the first surface faces in a first direction;
the first segment includes a second surface facing in a second direction, opposite the first direction;
the second segment includes third and fourth surfaces joined at the distal end and facing in third and fourth opposite directions, respectively, and continuous with the first and second surfaces, respectively;
the blade body includes fifth and sixth surfaces facing in fifth and sixth opposite directions and connected at the edge;
the second and fourth surfaces are joined by the first seam; and,
the fourth and sixth surfaces are joined by a second seam.

10. The torque converter of claim 9, wherein the second, fourth, and sixth surfaces are each respective smoothly curved surfaces.

* * * * *